Patented June 20, 1933

1,915,048

UNITED STATES PATENT OFFICE

JOHN H. CLEWELL, OF ARLINGTON, NEW JERSEY, ASSIGNOR TO DU PONT VISCOLOID COMPANY, OF WILMINGTON, DELAWARE, A CORPORATION OF DELAWARE

SAFETY GLASS

No Drawing.   Application filed August 8, 1930. Serial No. 474,073.

This invention relates to safety glass, that is, glass in which the pane is made up of glass proper and a strengthening layer of a suitable somewhat flexible material, such as pyralin, celluloid and the like attached to the glass, to prevent shattering and splintering of the glass. In such composites or sandwiches the adhesion of the strengthening layer to the glass is obtained in various ways, well understood by those skilled in the art, as by direct adhesion between the glass and the strengthening layer, or by the use of an adhesive between the glass and the strengthening layer. A major problem is the obtaining of adhesion between the laminations which will properly prevent separations between the glass and the strengthening layer. I have devised a safety glass which is highly resistant to, and free from, separations between its laminations.

One object of the invention is to provide a safety glass highly resistant to separations between its laminations. A further object is to provide a safety glass embodying an adhesive between its strengthening layer and its glass layer which adhesive shall give a particularly strong and effective bond between the glass and the strengthening layer. A further object is to provide a safety glass including a bond which is of extreme tightness and of high resistance to water. A further object is to provide a safety glass comprising a layer of a vegetable protein. To these ends and also to improve generally on safety glass the invention consists in the various matters hereinafter described and claimed.

In accordance with the invention there is used in the safety glass a component comprising a vegetable protein. Preferably such component is present as an adhesive between the glass and the plastic strengthening layer. Various vegetable proteins may be used, such as those from legumens, e. g. soya bean protein, and those from grain, e. g. gliadin from wheat and rye, zein from corn, and hordin from barley. I have found that such proteins give a highly moisture-resistant and weather-resistant safety glass having a very high degree of non-shatterability.

While crude pastes made from vegetable matters have, in certain instances, been found to be sufficiently adhesive for certain purposes, for example a water paste made from wheat flour is a suitable adhesive for binding paper in the well known manner, such pastes are entirely unsatisfactory for safety glass purposes. I have found, however, that the vegetable proteins, when properly extracted from their base substances, provide highly superior adhesives for safety glass use.

Gliadin is the principal prolamine of wheat and is completely insoluble in water and absolute ethyl alcohol but is soluble in dilute alcohol, the limits of solubility being between 26% water and 49% water by volume. Gliadin is soluble in some other organic solvent, e. g. methyl alcohol, benzyl alcohol, phenol, glacial acetic acid. It is also dispersed in dilute acids and alkalies. The first reference to wheat proteins in the literature is found in 1805 where Einhof, in "Neues allgemeine Jahresberichte der deutsche Chemie" 5 131–153, described the obtaining of an alcoholic extract of gluten from flour.

In 1820 Taddei found that a certain portion of the gluten in wheat flour is insoluble in alcohol but that part is soluble in alcohol. The part that is soluble in alcohol he called gliadin. This is described in "Thompson's Ann. Phil." 15 390 (abstract). Important contributions to the study of grain proteins were made in 1907 by Osborne in "Carnegie Institution of Washington" publication number 84, and in 1911 by Greaves in the "University of California Pub. Phys." 4 No. 6 31–74. Bailey and Blish in 1915 made a very excellent contribution to the information on grain proteins in "Journal Biological Chemistry" 23 345–357.

Gliadin may be prepared from gum gluten. To prepare gum gluten, wheat flour is washed repeatedly, which removes the starch and leaves a highly nitrogenous residue called gluten. This crude product must be vacuum-dried at a low temperature because its properties at this stage are injured by heat. Crude gum gluten, which is a regular commercial product, contains approximately 82% of protein matter and about half of this protein matter consists of gliadin.

Carrying on the operations at room temperature, 40.0 g. of the gum gluten is treated with 1.6 litres of 0.07 N acetic acid for 2½ hours with vigorous shaking. The suspension is then allowed to stand 1½ hours, during which time the suspended material settles to the extent that about two-thirds of the supernatant liquid containing gliadin can be siphoned off. Approximately one more litre 0.07 N acetic acid is then added to the residue with stirring, and the insoluble portion again allowed to settle and the clear supernatant liquid containing gliadin siphoned off and added to the extract previously withdrawn. The total extract, nearly 1½ litres in volume, is then carefully filtered, after which the gliadin is precipitated therefrom with approximately 10. g. of lithium chloride dissolved in a small amount of water and added with slow stirring.

After the gliadin has settled, the water is poured off and the gliadin dissolved in 100. cc. of dilute ethyl alcohol of approximately 60% alcohol by volume. Gliadin at this state of preparation is sufficiently pure for safety glass use, i. e. about 90% pure, the 10% consisting mainly of other wheat proteins. By redissolving and reprecipitating it may be further purified if desired. Gliadin may also be separated from gum gluten, or directly from wheat flour, by repeated extractions with 70% ethyl alcohol (by volume).

The gliadin may be embodied in the safety glass in any convenient manner. For example, the solution of gliadin in dilute ethyl alcohol, obtained by one of the above processes, may be diluted with ethyl alcohol and water to a 2½% (by weight) gliadin solution, and a thin coat may be applied to the glass and/or the plastic sheet by any suitable method, as spraying. The glass and plastic sheets may be assembled immediately after applying the coat of gliadin, or the coated surfaces may be allowed to stand before assembly, since the dried vegetable protein is amenable to heat and pressure operations causing it to adhere and properly bond the plastic and glass. It is desirable, of course, that a full even coat be applied over the entire surface and a plurality of sprayings may, of course, be used, drying between one spraying and the next. An adhesive layer of approximately .0005″ should be generally satisfactory. In place of the alcohol-water solvent mentioned, other solvents may be used having regard for the general results to be accomplished. The adhesive having been thus applied the assembly is subjected to pressure, desirably accompanied by heat, in the usual ways of the safety glass compositing art, as by a hydraulic press, the use of a temperature-liquid in an autoclave, etc., the particular manner of performing the final compositing action, forming no particular part of the present invention.

Inasmuch as the vegetable proteins are satisfactory adhesives for glass and the many various plastic strengthening layers usable in safety glass, such as carbohydrate plastics of plasticized cellulose acetate, cellulose nitrate, ethyl cellulose, benzyl cellulose, and other cellulose esters and ethers, safety glass embodying adhesives of the present type and any of the standard plastic sheets may be made. The methods of making such plastics may be any giving commercially satisfactory sheets, for example in making pyroxylin plastic sheets variations of considerable magnitude may be made from the usual standard composition, e. g. by the use of more or less camphor, by the use of camphor substitutes in place of camphor, or by altering the nitrogen content, etc. Also the plastic may be made by either the usual plastic process or may be cast from a fluid dope according to the process used in the manufacture of moving picture film and the like.

Although gliadin has been more specifically referred to, as previously indicated other vegetable proteins may be used, and further examples of this are the use of zein from corn, and hordin from barley. Zein is prepared from corn and hordin from barley according to processes substantially identical with that described for the preparation of gliadin from wheat. They may be used substantially as above described in discussing gliadin.

While the invention has been more particularly described as embodied in safety glass wherein a strengthening layer of, e. g. plastic, is used and the vegetable protein is incorporated primarily as an adhesive, it may in certain cases and for certain purposes be desirable to use the vegetable protein directly between the glasses.

In this way particular advantage may be taken not only of the adhesive properties of the vegetable protein, but also of its strengthening properties; but in such cases it is recommended that the vegetable protein layer be of a thickness of, say, .005 inch or more. When thus used the protein may be prepared, and applied to the glass or glasses, as previously indicated, as by spraying.

Generally speaking, a safety glass composite comprises two sheets of glass with the strengthening layer therebetween, and an adhesive layer on each side of the strengthening layer, but it will be understood that this structure may be provided with additional laminations, of glass and/or adhesive and/or plastic in any manner desired to meet particular conditions and commercial demands, as will be understood by those familiar with the art. Also while safety glass is, ordinarily, transparent in all its components, any of the components may be colored as by dyeing or incorporated pigments. As will be understood, so far as they may be compatible, various vegetable proteins may be used in mixture for the vegetable protein coat, and furthermore, in cases wherein the protein coat comprises a plurality of layers (as spraying) the various layers may be of different proteins. Also, vegetable proteins may be mixed with other adhesive materials, using mutual solvents. Thus gliadin may be mixed with casein, cellulose acetate, cellulose nitrate, and certain resins, using, say, glacial acetic acid as a solvent; and gliadin may be mixed with one or more of a considerable number of cellulose esters and ethers, and resins, using, for example, a solution of phenol or glacial acetic acid in methyl alcohol or benzyl alcohol as a solvent.

I claim:—

1. As a new article of manufacture, a sheet of laminated glass including a layer substantially composed of water-insoluble vegetable protein.

2. As a new article of manufacture, a sheet of laminated glass including a layer substantially composed of water-insoluble vegetable protein, of the group composed of gliadin, zein, and hordin.

3. As a new article of manufacture, a sheet of laminated glass including a layer substantially composed of gliadin.

4. As a new article of manufacture, a sheet of laminated glass including a pair of glasses, a plastic strengthening layer and, as an adhesive between the plastic strengthening layer and the glasses, a layer substantially composed of water-insoluble vegetable protein.

5. As a new article of manufacture, a sheet of laminated glass including a pair of glasses, a plastic strengthening layer and, as an adhesive between the plastic strengthening layer and the glasses, a layer substantially composed of water-insoluble vegetable protein, of the group composed of gliadin, zein and hordin.

6. As a new article of manufacture, a sheet of laminated glass including a pair of glasses, a plastic strengthening layer and, as an adhesive between the plastic strengthening layer and the glasses, a layer substantially composed of gliadin.

In testimony whereof, I affix my signature.

JOHN H. CLEWELL.